J. H. ROSS.
PLUG FOR LIQUID CONTAINERS.
APPLICATION FILED APR. 8, 1918.
1,307,755.
Patented June 24, 1919.
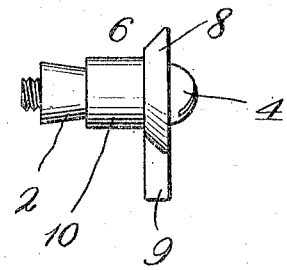
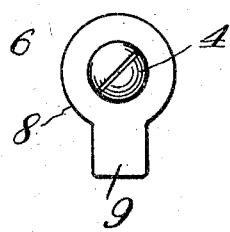
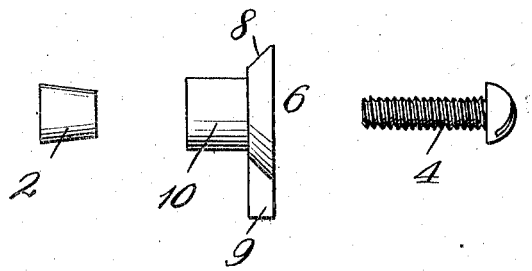
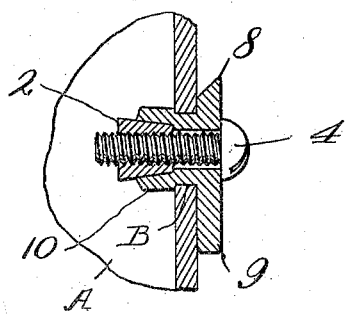
WITNESS:
INVENTOR:
John H. Ross,
BY
ATTORNEY.

UNITED STATES PATENT OFFICE.

JOHN H. ROSS, OF KANSAS CITY, MISSOURI.

PLUG FOR LIQUID-CONTAINERS.

1,307,755.     Specification of Letters Patent.     Patented June 24, 1919.

Application filed April 8, 1918. Serial No. 227,367.

*To all whom it may concern:*

Be it known that I, JOHN H. Ross, a citizen of the United States, residing at Kansas City, in the county of Jackson and State of Missouri, have invented certain new and useful Improvements in Plugs for Liquid-Containers, of which the following is a specification.

My invention relates to devices for plugging holes in sheet metal water tanks and similar containers, and my object is to provide a simple, efficient and inexpensive device of this character whereby plumbers, steam fitters, and other mechanics are enabled to make repairs at a small expenditure of time and labor.

In order that the invention may be fully understood, reference will now be made to the accompanying drawing, in which:

Figure 1 is a side elevation of the device assembled and ready for use.

Fig. 2 is a front elevation of the device.

Fig. 3 is a side elevation of the several elements ready for assembly.

Fig. 4 is a sectional view showing the device applied to a hole in a tank.

Referring now in detail to the various parts, A designates a portion of a sheet metal tank having a hole B in the side thereof.

In carrying out my invention, I employ a wedge member 2 of trunco-conical form internally threaded to receive the threaded portion of a screw 4, which holds the several parts in assembled relation to each other. 6 designates a sleeve of relatively soft metal, such for instance as lead. Said sleeve 6 is provided at its forward end with a flange 8 having a marginal lug 9 projecting therefrom. The main portion 10 of the sleeve is of greater diameter than the widest portion of the wedge member 2, so that the latter will readily pass through any opening large enough to receive said main portion 10.

In practice, an aperture in a tank can be readily sealed by first drilling said aperture to form a clean round opening free from projections or other irregularities. The assembled device is then passed through the aperture until the flange 8 abuts the outer side of the tank. A screw driver is then applied to the head of the screw 4 and the same is rotated to draw the wedge member 2 into the cylindrical body portion 10 of the sleeve 6. As the wedge member 2 moves inwardly the body portion 10 of the sleeve is expanded and completely fills and seals the aperture. Leakage around the screw 4 is prevented by the head thereof being drawn firmly into engagement with the outer face of the sleeve 6, which is prevented from rotating with the screw through the intermediacy of the lug 9 which is held stationary by the person making the repair.

Noncorrosive metals are, preferably, used in the construction of the device, so that a patch made therewith will be permanent and not liable to rust out. The device may be made in several sizes to fit different size apertures.

From the foregoing description, it is apparent that I have produced a device possessing the advantages above pointed out, and while I have shown and described a preferred embodiment of the invention, I reserve the right to make such changes in the construction, proportion and arrangement of parts as properly fall within the spirit and scope of the invention.

Having thus described my invention, what I claim and desire to secure by Letters Patent, is:

A device of the character described, comprising a pliable metal sleeve for placement in the aperture of a sheet metal tank and provided at its outer end with a marginal flange having a member projecting therefrom to prevent it from turning in the aperture, an internally-threaded wedge member independent of said sleeve and its flange, and a screw abutting the flanged end of the sleeve and threaded into said wedge member to draw the same into the sleeve and expand the latter and cause it to completely close the aperture in the tank, substantially as described.

In testimony whereof I affix my signature, in the presence of two witnesses.

JOHN H. ROSS.

Witnesses:
F. G. FISCHER,
L. J. FISCHER.

Copies of this patent may be obtained for five cents each, by addressing the "Commissioner of Patents, Washington, D. C."